July 30, 1968 T. TAGLIOLI 3,394,483
BAIT CATCHER
Filed Oct. 18, 1965
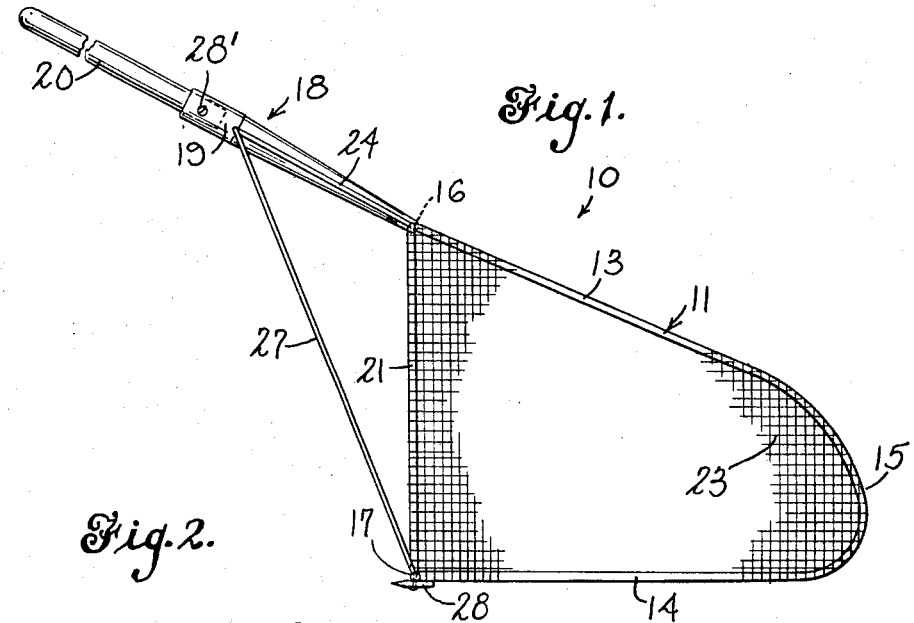
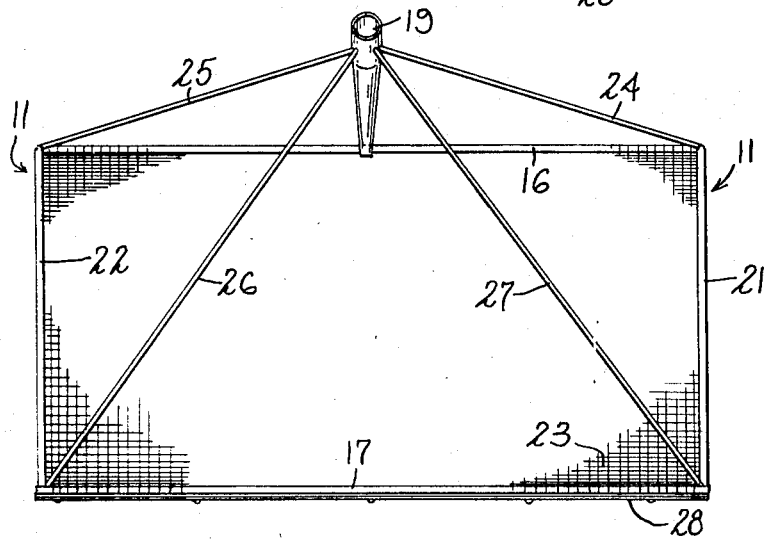
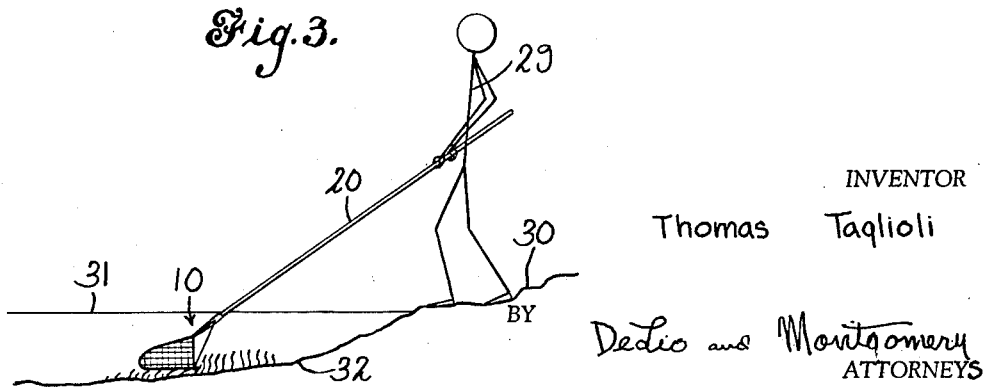
INVENTOR
Thomas Taglioli
BY Dedio and Montgomery
ATTORNEYS United States Patent Office 3,394,483
Patented July 30, 1968

3,394,483
BAIT CATCHER
Thomas Taglioli, P.O. Box D, Kincaid, Ill. 62540
Filed Oct. 18, 1965, Ser. No. 496,889
4 Claims. (Cl. 43—11)

ABSTRACT OF THE DISCLOSURE

A bait catcher which is formed by upper, lower and side rod means defining a generally rectangular framed opening and further rod means defining a basket frame which is covered with a water pervious material. A handle extends from the upper horizontal rod and reinforcing rods extend from all corners of the frame of the opening to the handle to equalize the pull on the basket to all corners of the opening thereof. The lower rod is provided with a knife edge for removal of submarine growth.

---

This invention relates to fishing apparatus, and more particularly relates to apparatus for catching bait and other small aquatic life.

Bait catchers of the type to which this invention relates have generally comprised a net carried at the end of a handle which is dipped beneath the surface of the water and then raised to attempt to trap small aquatic life therein. Such bait catching apparatus is generally made so that the handle and the frame of the net reside substantially in a single plane. This apparatus may be immersed in the water with the net opening vertically disposed so that it can be swept horizontally in the water to trap bait therein. Constructions have also been proposed where the angle of the plane of the net frame opening and the handle have been made adjustable to facilitate catching bait by raising the net upwardly. These various described constructions have found usage and success in various degrees dependent mainly upon the skill of the user. However, none are known to have offered great facility for dragging near or on the bottom or bed of a stream or river.

The present invention provides a new and improved bait catcher which is so constructed and arranged that it may be immersed in a stream, lake or river at the edge thereof and utilized in the manner of a push broom using almost exclusively reciprocatory motion to trap and remove bait from the water.

A bait catcher embodying the invention is constructed and arranged to be pulled toward the user with the open end of the net or basket facing the user. The handle is so disposed and arranged with respect to the opening in the basket that it may be easily utilized by a person of slight build. Additionally, the basket frame is so constructed as to hold the net portion thereof in a substantially constant position and prevent collapse of the netting. The frame of the bait catcher is further so constructed and arranged that the basket may be dragged on or near the bed of a body of water without the danger or problem of tangling or otherwise catching the netting on objects at the bottom.

Accordingly, an object of this invention is to provide a new and improved bait catcher.

Another object of this invention is to provide a bait catcher having a new and improved handle-basket arrangement which allows it to be used with great facility from the edge of a stream or river.

A further object of this invention is to provide a bait catcher adapted to be dragged or moved along the bottom of a body of water by a person standing on a bank, and having new and improved means for preventing tangling of the net or basket in submarine growth.

A still further object of this invention is to provide a new and improved bait catcher which may be moved with facility through growth at or adjacent the bottom of a stream while minimizing the problem of tangling or otherwise fouling the bait catcher in such growth.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, in which:

FIG. 1 is a side elevation of a device embodying the invention;

FIG. 2 is an elevation of the device of FIG. 1 seen from the left side thereof with the handle removed; and FIG. 3 is a view of the device of FIGS. 1 and 2, being operated by an individual on the bank.

A bait catcher comprising the invention is identified by the reference numeral 10 and generally comprises a pair of spaced apart generally U-shaped side members 11 (only one shown) having legs 13 and 14. The lowermost leg 14 is so formed that when it is placed in an operative position for dragging for bait, leg 14 is substantially parallel to or forms only a small acute angle with respect to a base plane such as a stream bottom. The other leg 13, joined to leg 14 by a gentle curving portion 15, defines with leg 14 an acute angle and extends upwardly. The free ends of legs 11 are connected at the top by a bar 16 and at the bottom by a bar 17. Mounted to bar 16 is a handle assembly 18 which comprises a receptacle portion 19 adapted to receive an elongated handle in the form of a rod 20 therein. Also joining and extending between the free ends of each of the U-shaped members 11 are generally vertical frame members 21 and 22. The frame members 16, 17, 21 and 22 generally define a rectangular opening to the frame which is otherwise covered by a wire mesh or other suitable water-pervious material 23. Extending from the corners of the frame members defining the rectangular opening to handle receptacle 19 are bracing rods 24, 25, 26 and 27. These rods serve a dual purpose in that they brace the corners of the frame defining the rectangular opening and, further, act to transmit a pull from the handle assembly to all corners of the frame. This aids in preventing the bottom rod 17 from becoming lodged or caught by subterranean growth, rocks, etc. when the basket is dragged along or moved slightly above the bottom of a stream as might be the case if the bracing rods were not provided and the only pull on the net frame is exerted on bar 16.

Further, in accordance with the invention the bottom rod or bar 17 is provided with a sharp knife edge, or alternatively as illustrated, a removable knife-like piece of metal 28 is secured thereto by means of bolts.

The knife-like edge is provided to cut subterranean vegetation and permit movement of and facilitate retrieval of the basket portion of the bait catcher in and through weedy or grassy bottoms, and yet catch the bait in the basket. It is well known that most live bait, crayfish, etc., harbor along the bottom and in grassy or weedy areas of shallow streams, river beds, etc. The handle, for facility in transporting and storing, is adapted to be removed from receptacle 19. In use it is held therein by a pin or screw 28', extending through receptacle 19 into handle 20. Alternatively, handle 20 may be threaded into receptacle 19. Preferably the handle extends from the plane defined by the rectangular opening at an angle greater than 90° and less than 180°. The angle that the handle makes with arm or leg 14 of the side frames may be substantially the same angle as made by leg 13 with leg 14 or slightly greater.

In practice, it has been determined that a fairly optimum size of the rectangular opening in the basket is approximately 20″ x 11″ and the frame may be made of ⅜″ aluminum stock to minimize the weight thereof. In this construction the rod 17 is made of one-eighth inch by one and one-half inch stock 21″ long, with a one inch wide, twenty inch long steel blade 28. The handle 20 has been made six-foot long of 1″ or 1¼″ aluminum tubing to fit inside handle receptacle 19. It will of course be understood that the dimensions set forth are merely exemplary. This provides a lightweight structure which may be easily handled.

To utilize the bait catcher 10 a person indicated in line form 29 may stand on a bank 30 adjacent a body of water, such as a stream 31, insert the bait catcher 10 into the water along the bottom 32 thereof and pull the bait catcher toward himself, effectively dredging along the bottom where small bait fish normally harbor in shallow waters. The blade or knife edge 28 facilitates the movement of the basket through the submarine growth and the rods 26 and 27 transmit the pull exerted on the handle to the bottom corners of the basket which prevents or minimizes any tendency of the bottom rod 17 or blade 28 thereon digging in and tending to cock the basket in a clockwise direction as viewed in FIG. 3.

From the foregoing description it may be seen that the objects of the invention set forth above as well as those made apparent from the preceding description are efficiently attained. While a preferred embodiment of the invention has been shown, other embodiments of the invention and modifications to the disclosed embodiment thereof which do not depart from the spirit and scope of the invention may occur to others skilled in the art. Accordingly, the appended claims are intended to cover all modifications and embodiments of the invention which do not depart from the spirit and scope thereof.

What is claimed is:

1. A fish bait catching device comprising a frame including upper, lower and side rods connected together and defining a generally rectangular framed opening residing in a substantially vertical plane when said frame is in an operative position, the greater dimension of said opening being in the horizontal direction and other frame means attached to said rods defining a basket frame, a water pervious material disposed about and carried on all sides of said frame excepting the opening, handle means extending from said upper rod away from said frame and forming an obtuse angle with the plane of said opening, and reinforcing rods extending from the corners of said rectangular framed opening to said handle means to transmit a pulling force exerted on said handle means to all of said corners, the bottom of said basket frame residing in a plane substantially perpendicular to the plane of said opening.

2. A fish bait catching device comprising a basket frame including upper, lower and side rod means connected together and defining a generally rectangular framed opening residing in a substantially vertical plane when said frame is in an operative position, a water pervious material disposed about and carried on all sides of said frame excepting the opening, a handle receptacle extending from said upper rod away from said frame and forming an obtuse angle with the plane of said opening, and arranged to receive an elongated detachably mountable handle therein, and reinforcing rods extending from the corners of said rectangular framed opening to said handle receptable to transmit a pulling force exerted on the handle to all of said corners, the bottom of said basket frame residing in a plane substantially perpendicular to the plane of said opening.

3. A fish bait catching device comprising a basket frame including upper, lower and side rod means connected together and defining a generally rectangular framed opening residing in a substantially vertical plane when said frame is in an operative position, the greater dimension of said opening being in the horizontal direction, a water pervious material disposed about and carried on all sides of said frame excepting the opening, handle means extending from said upper rod away from said frame and forming an obtuse angle with the plane of said opening, and reinforcing rods extending from the corners of said rectangular framed opening to said handle means to transmit a pulling force exerted on said handle means to all of said corners, the bottom of said basket frame being planar and residing in a plane substantially perpendicular to the plane of said opening, said lower rod of said rectangular framed opening having an edge thereon constructed and arranged to cut through submarine growth as said frame is pulled along the bed of a body of water.

4. The device of claim 3 wherein said edge is detachably mounted to said lower rod.

References Cited
UNITED STATES PATENTS

| | | | |
|---|---|---|---|
| 97,420 | 11/1869 | Mayhew | 37—119 |
| 284,156 | 8/1883 | Woodruff | 37—119 |
| 1,014,250 | 1/1912 | Norman | 56—400.11 |
| 2,985,974 | 5/1961 | Worcester | 37—119 X |

WARNER H. CAMP, *Primary Examiner.*